United States Patent
Wu

(10) Patent No.: US 8,208,881 B2
(45) Date of Patent: *Jun. 26, 2012

(54) RADIO FREQUENCY RECEIVER AND RADIO FREQUENCY TRANSMITTER

(75) Inventor: Chia-Hsin Wu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 493 days.

This patent is subject to a terminal disclaimer.

(21) Appl. No.: 12/326,192

(22) Filed: Dec. 2, 2008

(65) Prior Publication Data

US 2009/0081974 A1 Mar. 26, 2009

Related U.S. Application Data

(63) Continuation of application No. 11/382,108, filed on May 8, 2006, now Pat. No. 7,477,918.

(51) Int. Cl.
*H04B 1/26* (2006.01)
*H04B 1/16* (2006.01)

(52) U.S. Cl. ........... 455/196.1; 455/209; 455/323

(58) Field of Classification Search ........... 455/118, 455/130, 139, 150.1, 190.1, 192.1, 196.1, 455/323, 285, 340, 341, 209

See application file for complete search history.

(56) References Cited

U.S. PATENT DOCUMENTS

| | | | |
|---|---|---|---|
| 5,081,650 A * | 1/1992 | Hasegawa et al. | 375/324 |
| 5,852,603 A * | 12/1998 | Lehtinen et al. | 370/280 |
| 6,075,980 A * | 6/2000 | Scheck | 455/324 |
| 6,351,502 B1 | 2/2002 | Zargari | |
| 6,404,293 B1 | 6/2002 | Darabi et al. | |
| 6,535,748 B1 | 3/2003 | Vuorio et al. | |
| 6,574,462 B1 | 6/2003 | Strange | |
| 6,711,397 B1 * | 3/2004 | Petrov et al. | 455/324 |
| 6,785,518 B2 * | 8/2004 | Atkinson et al. | 455/86 |
| 6,804,261 B2 | 10/2004 | Snider | |
| 6,850,748 B2 | 2/2005 | Song et al. | |
| 6,850,749 B2 | 2/2005 | Soorapanth et al. | |
| 6,917,815 B2 | 7/2005 | Hajimiri et al. | |
| 6,987,957 B2 * | 1/2006 | Suzuki et al. | 455/147 |
| 7,092,676 B2 | 8/2006 | Abdelgany et al. | |
| 7,418,247 B2 | 8/2008 | Asayama et al. | |
| 7,424,271 B2 | 9/2008 | Shih et al. | |
| 7,565,112 B2 * | 7/2009 | Ragan | 455/63.1 |
| 7,620,373 B2 * | 11/2009 | Cole et al. | 455/73 |
| 7,907,916 B2 * | 3/2011 | Cole et al. | 455/73 |
| 7,965,988 B2 * | 6/2011 | Cole et al. | 455/73 |
| 7,974,593 B2 * | 7/2011 | Cole et al. | 455/114.3 |
| 2003/0138034 A1 | 7/2003 | Shi et al. | |

OTHER PUBLICATIONS

"5 GHz and 2.4 GHz Dual Band RF-Transmitter for WLAN 802.11a/b/g Applications" Klepser et al., pp. 37-40, 2003 Ieee MTT-S Digest.

* cited by examiner

*Primary Examiner* — Sonny Trinh
(74) *Attorney, Agent, or Firm* — Thomas|Kayden

(57) ABSTRACT

A radio-frequency receiver. The radio-frequency receiver includes a first and second low noise amplifier (LNA), a local oscillating module, and a first, second, and third mixer. The first LNA amplifies a first RF signal. The local oscillating module generates a first, second and third local oscillating signals. The first local oscillating signal is generated according to the second local oscillating signal. The first mixer mixes the first RF signal with the first local oscillating signal to generate an intermediate frequency signal. The second LNA amplifies a second RF signal. The second and third mixers can be operated in two modes. The second and third mixers mix the intermediate frequency signal to generate a first and second baseband signal respectively in the first mode, and the second and third mixers mix the second RF signal with the second and third oscillating frequency respectively in a second mode.

46 Claims, 9 Drawing Sheets

RADIO FREQUENCY RECEIVER AND RADIO FREQUENCY TRANSMITTER

CROSS REFERENCE TO RELATED APPLICATIONS

This application is a continuation of U.S. application Ser. No. 11/382,108, filed May 8, 2006, and entitled "Radio Frequency Receiver and Radio Frequency Transmitter".

BACKGROUND OF THE INVENTION

Field of the Invention

The present invention relates to wireless communications and, more particularly, to wideband wireless communication system.

Advances in communication technology have led to an increase in the popularity of wireless communication. Today, various efforts are under way to apply wireless communication to replace attachment networking cables used for connecting clients, servers and the like. Examples of technology to accomplish wireless networking include the different variants of the IEEE 802.11 standard, 802.11a, 802.11b and 802.11g.

For some applications, it is desirable for a device to be able to operate in multiple wireless protocols. However, the need cannot be met by simply providing the device with multiple transceivers, one for each protocol. Sharing core elements of the communication devices is a common means of reducing the area of those communication devices.

The radio frequency of 802.11a uses the 5 GHz spectrum, and the radio frequency of 802.11b/g operates in the 2.4 GHz spectrum. To receive a wide range of these radio signals, a well-designed voltage-controlled oscillator (VCO) or a VCO bank including VCO couples is required. FIG. 1 shows a block diagram of a conventional transceiver covering three wireless network standards 802.11a/b/g. The VCO bank usually consists of 2 or more VCOs to cover the spectrum of the radio frequencies, hence, the area is increased.

BRIEF SUMMARY OF THE INVENTION

Accordingly, a radio-frequency receiver for wideband with only one VCO is provided. The radio-frequency receiver comprises a first and second low noise amplifier (LNA), a local oscillating module, and first, second, and third mixers. The first low noise amplifier (LNA) amplifies a first RF signal. The local oscillating module generates a first, second and third local oscillating signals. The first oscillating signal is generated according to the second signal, and the second and third local oscillating signals have a phase difference of about 90 degrees. The first mixer mixes the first RF signal with the first local oscillating signal to generate an intermediate frequency signal. The second LNA amplifies a second RF signal. The second and third mixers are coupled to the first mixers, and configured in two modes. The second and third mixer mixes the intermediate frequency signal to respectively generate a first and second baseband signals in a first mode. The second and third mixers mix the second RF signal with the second and third oscillating frequency respectively in a second mode.

The invention further provides a radio-frequency transmitter. The radio-frequency transmitter comprises a first, second and third mixers, a local oscillating module, a first and second amplifier, and a combiner. The first and second power amplifiers amplify first and second baseband signals, wherein the phase difference of the first and second baseband signal is about 90 degrees. The local oscillating module generates first, second and third local oscillating signals, wherein the third oscillating signal is generated according to the second signal, and the first and second local oscillating signals have a phase difference about of 90 degrees. The first and second mixers mix the first and second baseband signals with the first and second local oscillating signal respectively to generate a first and second intermediate frequency signals. The combiner combines the first and second intermediate frequency signal into an intermediate frequency signal. The third mixers coupled to the combiner mixes the intermediate frequency signal with the third oscillating signal to generate a first RF signal.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the present invention.

DETAILED DESCRIPTION OF THE INVENTION

Figure 1:
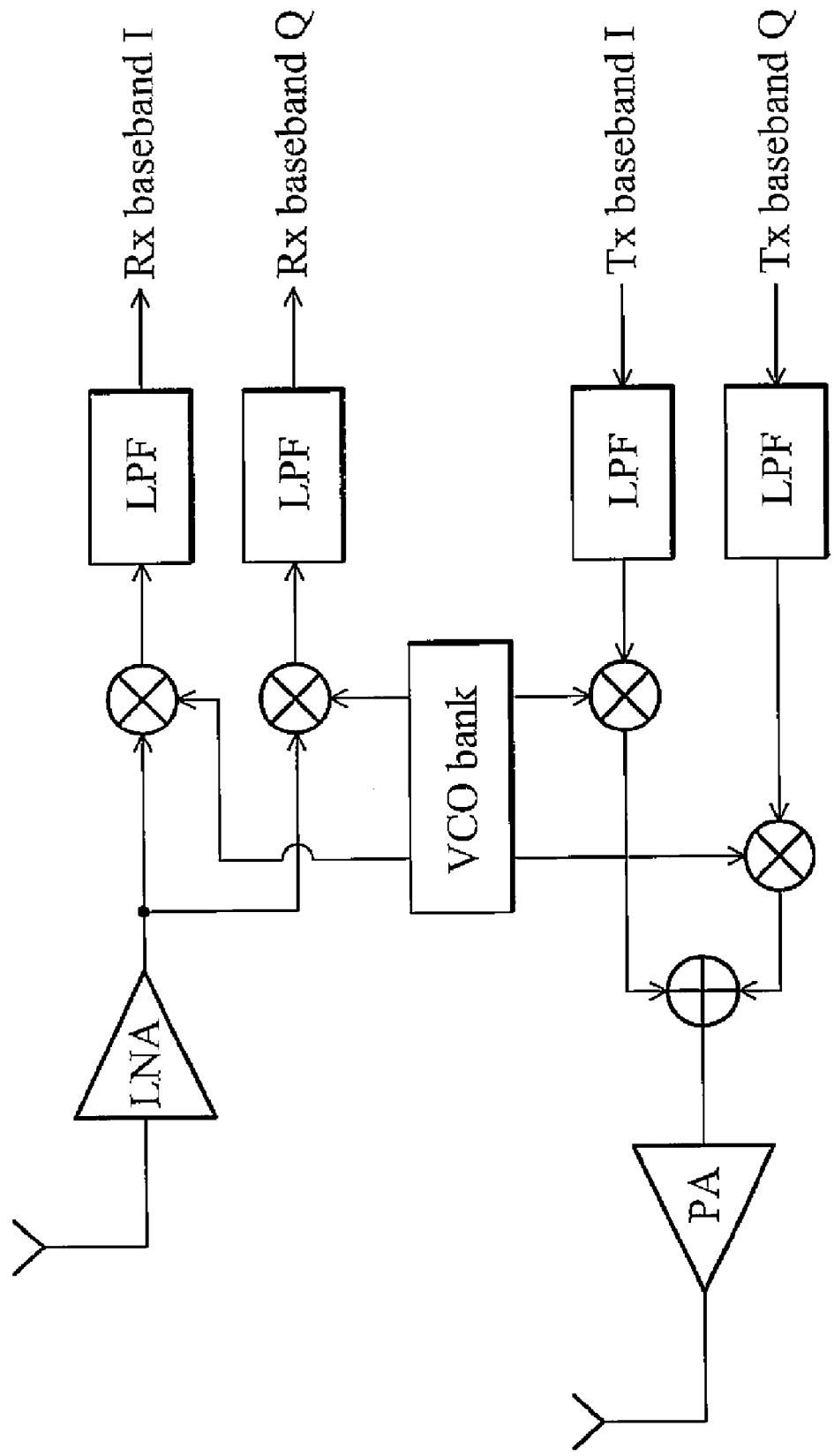
FIG. 1 shows a block diagram of conventional transceiver covering three standards 802.11a/b/g.
Figure 2A:
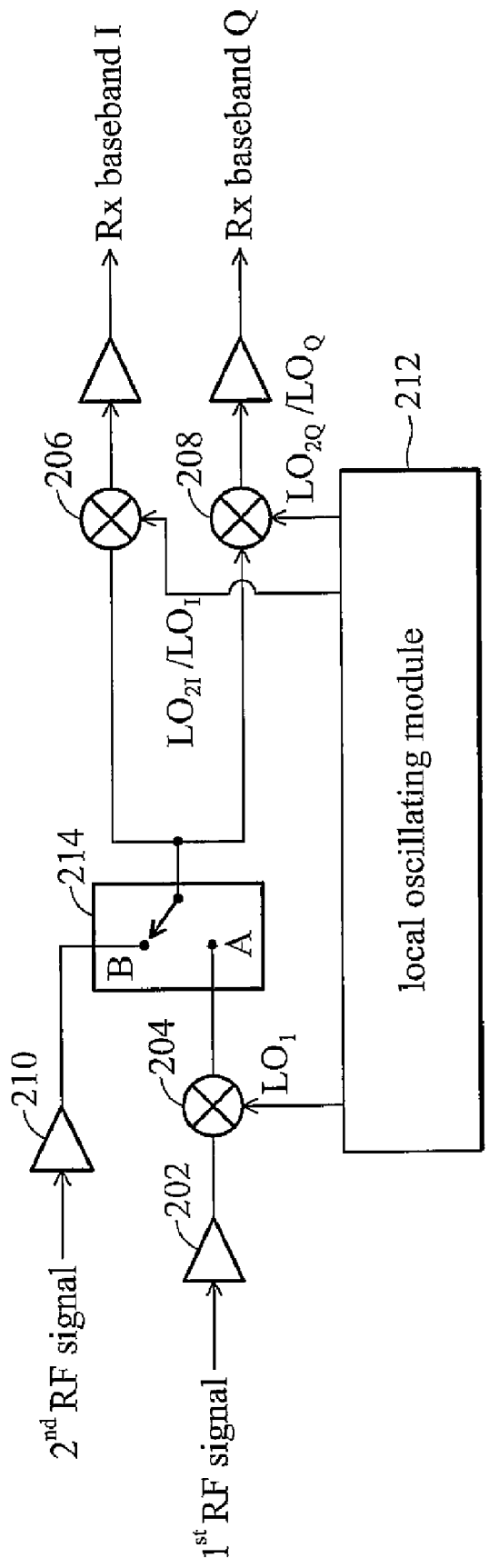
FIG. 2 shows a block diagram of a radio-frequency receiver according to an embodiment of the invention.

FIG. 2a shows a radio-frequency receiver according to an embodiment of the invention. The radio-frequency receiver comprises a first and second low noise amplifier (LNA) 202 and 210, a local oscillating module 212, a switch 214 and a first, second, and third mixers 204, 206, and 208. The first LNA 202 amplifies a first RF signal. The first mixer 204 is coupled to the first LNA 202. The local oscillating module 212 generates a first, second and third local oscillating signals, $LO_1$, $LO_{2I}/LO_I$, and $LO_{2Q}/LO_Q$, while the phase difference between the second and third local oscillating signals is about 90 degrees. In this embodiment of the invention, the second oscillating signal is an I (in-phase) oscillating signal, and the third oscillating signal is a Q (quadrature) oscillating signal, while in other embodiments of the invention, the second oscillating signal is a Q oscillating signal, and the third oscillating signal is an I oscillating signal. The local oscillating module 212 mixes the first RF signal with the first local oscillating signal $LO_1$ to generate an intermediate frequency signal. The second and third mixers 206 and 208 coupled to the local oscillating module can be operated in two modes. In a first mode, the switch 214 connects with node A, and the second and third mixer 206 and 208 mixes the intermediate frequency signal to respectively generate a first and second baseband signals. In the second mode, the switch 214 connects with node B, and the second and third mixers 206 and 208 respectively mix a second RF signal with the second and third oscillating frequency $LO_{2I}/LO_I$ and $LO_{2Q}/LO_Q$, where the second RF signal is received and amplified by the second LNA 210. The first, second, and third mixers in this embodiment of the invention are single-side band mixers, while in another embodiment of the invention, the first, second and third mixers can be double-side band mixers.

Figure 2B:
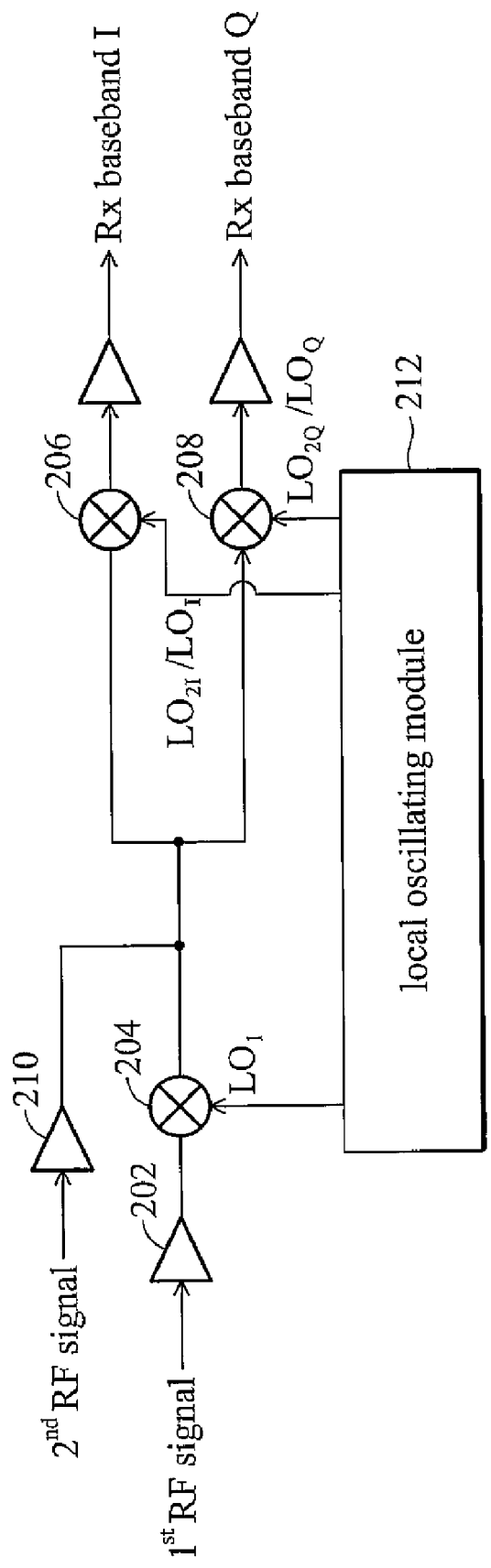

The switch 214 is optional. Three nodes of switch 214 can be connected together, as shown in FIG. 2B.

In this embodiment of the invention, the first RF signal is down-converted to intermediate frequency, and then down-converted to baseband signals. The second RF signal is converted directly to baseband.

Figure 3:
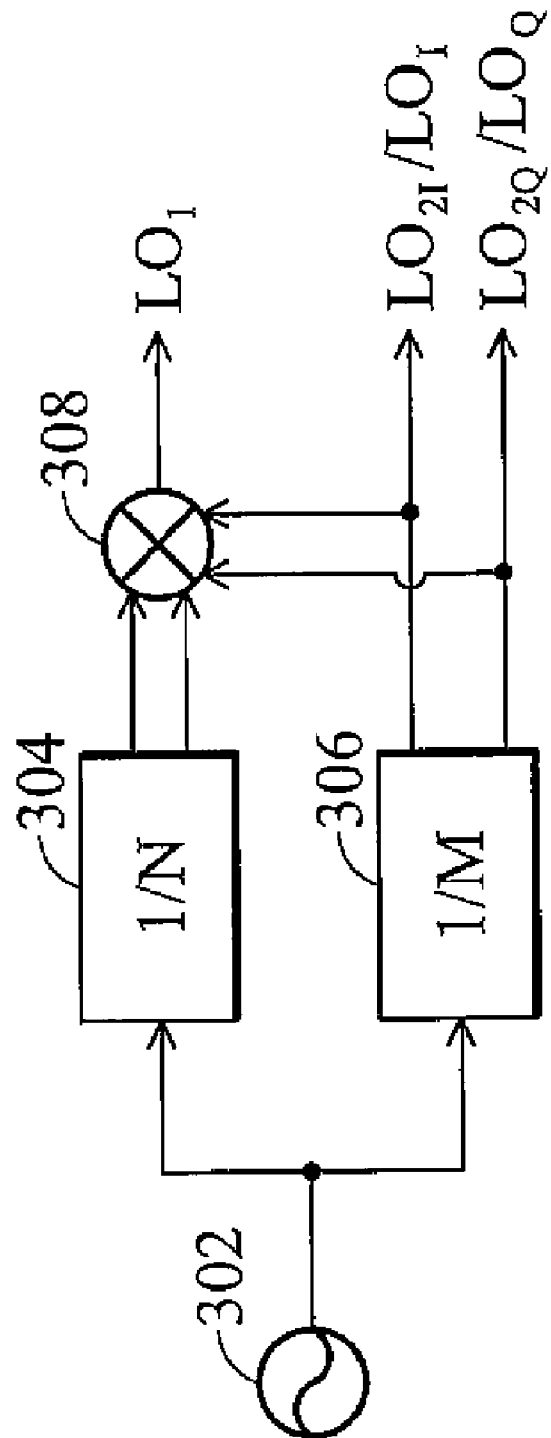
FIG. 3 shows a local oscillating module according to an embodiment of the invention.

FIG. 3 shows an embodiment of the local oscillating module 212. In this embodiment of the invention, the local oscillating module 212 comprises a controllable oscillator 302, a first and second frequency divider 304 and 306, and a mixer 308. The controllable oscillator 302 generates an original oscillating signal. The first frequency divider 304 divides the original oscillating signal by a factor of N to generate a first and a second frequency-divided oscillating signal. The second frequency divider 306 divides the original oscillating signal by a factor M to generate the second and third oscillating signals. The mixer 308 mixes the frequency-divided oscillating signals with the second and the third oscillating signal to generate the first oscillating signal. The frequency of the original oscillating signal is less than the first RF signal but excesses the second RF signal.

In a preferred embodiment of the invention, the first RF signal may an 802.11a RF signal, and the second RF may be an 802.11b/g RF signal, which means the RF receiver provided by the invention can meet 802.11a/b/g specifications with only one oscillator. Besides, by carefully choosing the original oscillating frequency, the RF receiver does not require an image rejection filter. Furthermore, the only oscillator does not have to work in a wild range. For example, the factor M of the local oscillation module in FIG. 3 is s to 2 and N is set to 4. When operated in 802.11a mode, the original oscillating frequency can be selected to be 4/5 times of RF signal, which is from about 3936 MHz to 4660 MHz. Table 1 shows examples of frequency planning received RF frequency, VCO frequency, $LO_1$, $LO_{2I/2Q}$. For 802.11b/g with same configuration of local oscillating module, the received RF frequency ranges from 2400 to 2500 MHz, and the VCO frequency can be selected to be 2 times of received RF frequency. Table 2. shows example of frequency planning received RF frequency, VCO frequency, $LO_{1/Q}$. Thus, the total range the VCO has to provide is from 3936 MHz to 5000 MHz and the tuning range of the VCO is $$\frac{(5000-3936)}{(5000+3936)/2} = 23.8\%. \quad (1)$$

Therefore, by carefully arranging the frequencies within the RF receiver, one VCO with small tuning range supporting both 802.11 and 802.11b/g can be realized.

TABLE 1

Examples of frequency planning of 802.11a.

| RF frequency | VCO frequency | $LO_1$ frequency | $LO_{2I/2Q}$ frequency |
| --- | --- | --- | --- |
| 4920 | 3936 | 2952 | 1968 |
| 5150 | 4120 | 3090 | 2060 |
| 5825 | 4660 | 3495 | 2330 |

TABLE 2

Examples of frequency planning of 802.11b/g.

| RF frequency | VCO frequency | $LO_{I/Q}$ frequency |
| --- | --- | --- |
| 2400 | 4800 | 2400 |
| 2500 | 5000 | 2500 |

Figure 4:
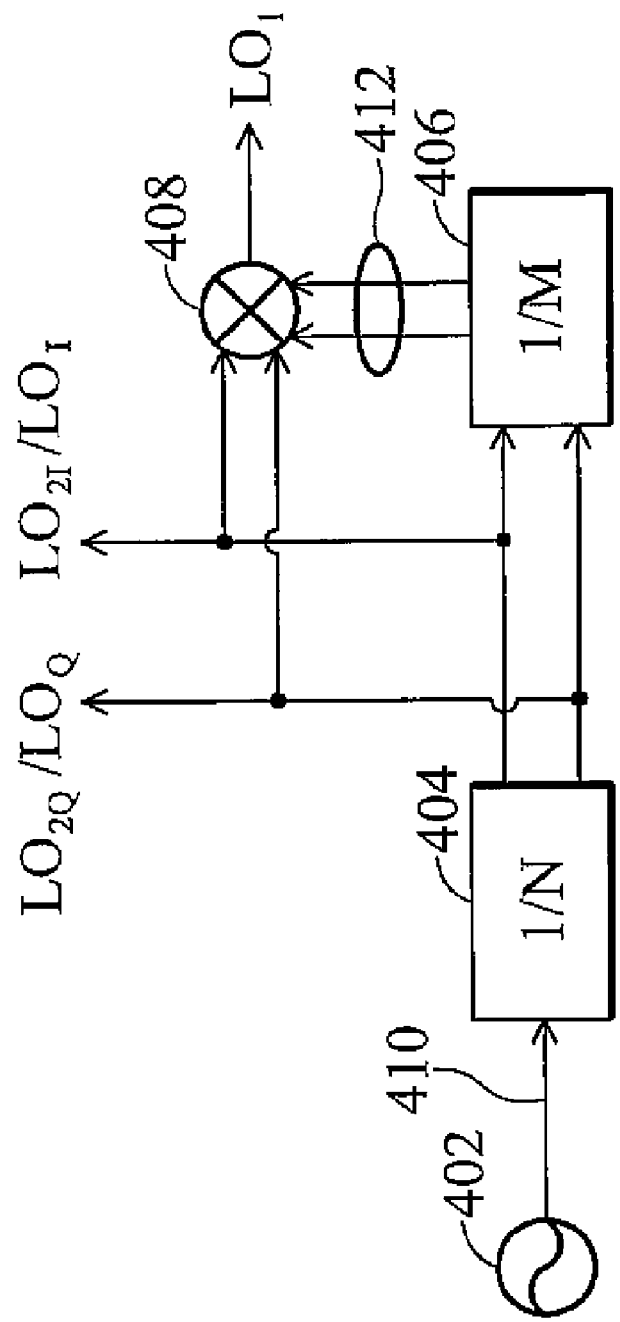
FIG. 4 shows another embodiment of the local oscillating module.

FIG. 4 shows another embodiment of the local oscillating module 212. In this embodiment of the invention, the local oscillating module 212 comprises a controllable oscillator 402, a first and second frequency divider 404 and 406, and a mixer 408. The controllable oscillator 402 generates an original oscillating signal. The first frequency divider 404 divides the original oscillating signal by a factor of N to generate the second and the third oscillating signals $LO_{2I}/LO_I$ and $LO_{2Q}/LO_Q$. The second frequency divider 406 divides the second oscillating frequency signal by a factor of M to generate a first and a second frequency-divided signal. The mixer 408 mixes the second oscillating signal $LO_{2I}/LO_I$ with the frequency-divided signals to generate the first oscillating signal $LO_1$. In this embodiment of the invention, the factor M is 2, and the factor N is 2.

Figure 5:
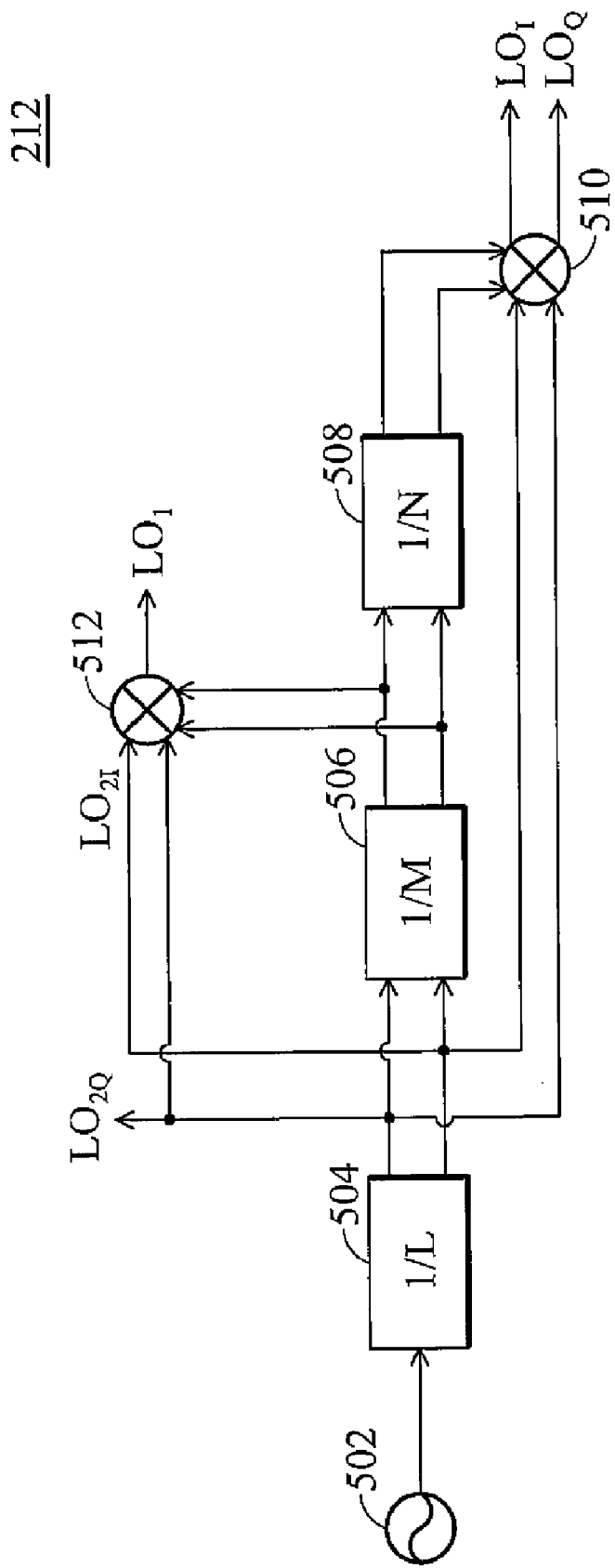
FIG. 5 shows yet another embodiment of the local oscillating module.

FIG. 5 shows yet another embodiment of the invention. In this embodiment of the invention, the local oscillating module comprises a controllable oscillator 502, a first, second, and third frequency divider 504, 506, and 508, and mixers 510 and 512. The controllable oscillator 502 generates an original oscillating signal. The local oscillating module can be operated in two modes. When operated in the first mode, the third frequency divider 508 and mixer 510 are not activated. The first frequency divider 504 divides the original oscillating signal by L to generate the second and third oscillating signals $LO_{2I}/LO_I$ and $LO_{2Q}/LO_Q$ the first mode. The second frequency divider 506 coupled to the first divider divides the second oscillating signal $LO_{2I}/LO_I$ by M to generate a first frequency-divided oscillating signal. Mixer 512 coupled to the first and second frequency dividers mixes the second oscillating signal $LO_{2I}/LO_I$ and first frequency-divided oscillating signal to generate the first oscillating signal $LO_1$. When operated in the second mode, all the elements of the local oscillating module 212 are activated. In the second mode, the second frequency divider 506 and mixer 512 operate the same as in the first mode. The first frequency divider 504 generates a first frequency-dividing oscillating signal. The third frequency divider coupled to the second frequency divider 508 divides the first frequency-divided oscillating signal by N to generate a second frequency-divided oscillating signal. Mixer 510 coupled to the first and third frequency divider mixes the first frequency-divided oscillating signal and the second frequency-divided oscillating signal to generate the second and third oscillating signals $LO_{2I}/LO_I$ and $LO_{2Q}/LO_Q$.

In a preferred embodiment of the invention, the factors L, M, and N are 2, 2, and 2. When operated in 802.11a mode, the original oscillating frequency can be selected to be 4/5 times of RF signal, which is between about 3936 MHz to 4660 MHz, as shown in Table 1. For 802.11b/g with same configuration of local oscillating module, the received RF frequency ranges 2400 to 2500 MHz, and the VCO frequency can be selected to be 8/5 times of received RF frequency. Table 3. shows example of frequency planning received RF frequency, VCO frequency, $LO_{1/Q}$.

TABLE 3

Examples of frequency planning of 802.11b/g.

| RF frequency | VCO frequency | $LO_{I/Q}$ frequency |
|---|---|---|
| 2400 | 3840 | 2400 |
| 2500 | 4000 | 2500 |

Figure 7:
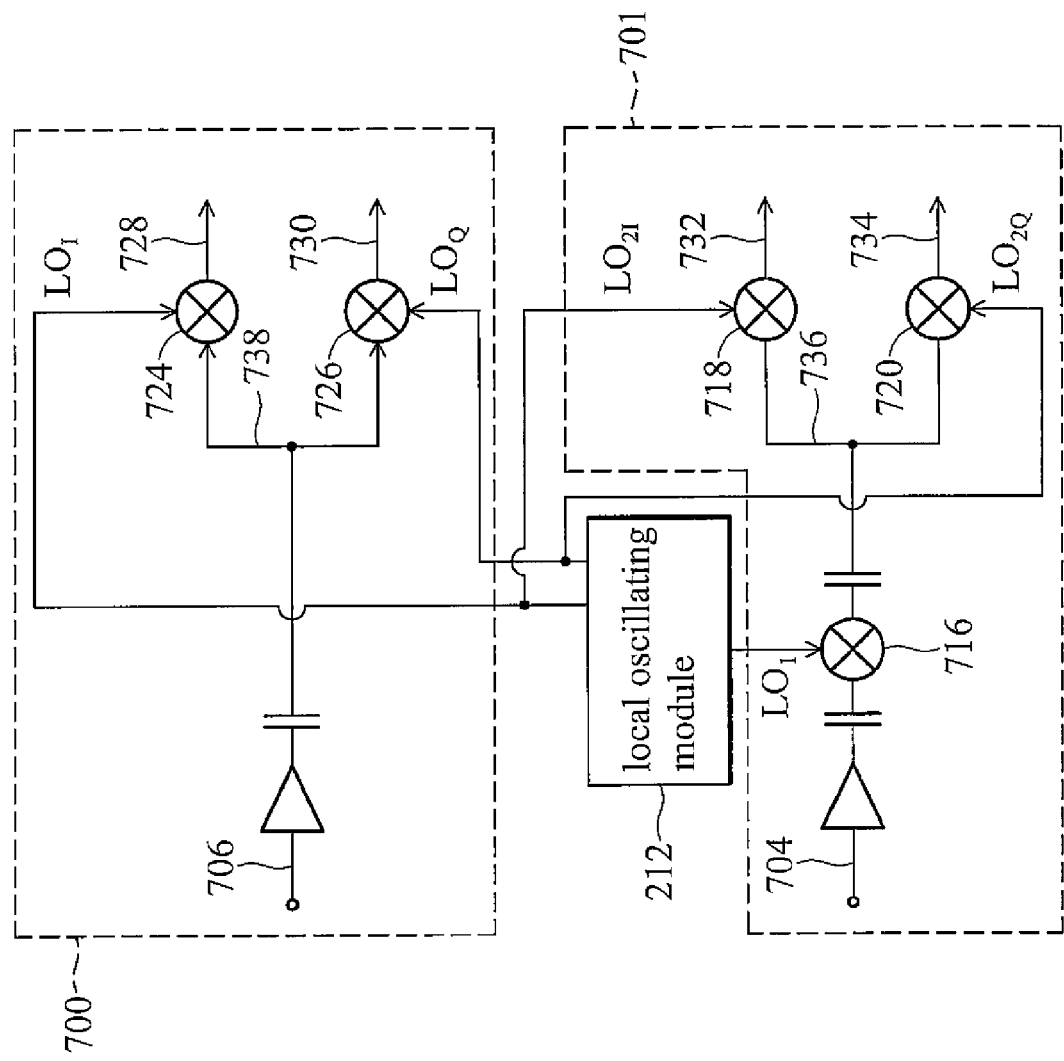
FIG. 7 shows another embodiment of an RF receiver.

FIG. 7 shows another embodiment of an RF receiver. The RF receiver includes two receiver portions 700 and 701 and a local oscillating module 212. The RF receiver can be used for receiving a first RF signal 704 in a first mode and for receiving a second RF signal 706 in a second mode. The first RF signal is, for example, an 802.11a RF signal and the second RF signal is, for example, an 802.11b/g RF signal. The implementation of local oscillating module can be as same as the local oscillating module 212 in either FIG. 3, 4 or 5. In this embodiment, the oscillating module 212 in FIG. 4 is employed. Note that in this embodiment of the invention, one VCO (a type of controllable oscillator) is enough to generate all local oscillating signals ($LO_I$, $LO_Q$, $LO_1$, $LO_{2I}$, and $LO_{2Q}$).

In the first mode, the VCO 402 generates an original oscillating signal 410. The original oscillating signal 410 is divided by a factor N to generate frequency-divided oscillating signals ($LO_{2I}$ and $LO_{2Q}$). Frequency-divided oscillating signals $LO_{2I}$ and $LO_{2Q}$ have a phase difference about 90 degrees. Frequency-divided oscillating signals ($LO_{2I}$ and $LO_{2Q}$) are further divided by a factor M to generate frequency-divided oscillating signals 412. Frequency-divided oscillating signals ($LO_{2I}$ and $LO_{2Q}$) and frequency-divided oscillating signals 412 are mixed by a mixer 405 to generate the local oscillating signal $LO_1$. The mixer 408 is a single side band mixer in this embodiment.

The first RF signal 704 is received and mixed with the local oscillating signal $LO_1$ by a mixer 716 to generate an intermediate frequency signal 736. The intermediate frequency signal 736 is mixed by mixers 718 and 720 to generate base band signals 732 and 734 respectively.

Jointly referring FIG. 4 and FIG. 7, in the second mode, the VCO 402 generating an original oscillating signal 410. The original oscillating signal 410 is divided by a factor N to generate frequency-divided oscillating signals ($LO_I$ and $LO_Q$). Frequency-divided oscillating signals $LO_I$ and $LO_Q$ have a phase difference about 90 degrees.

The second RF signal 706 is received and mixed with the local oscillating signal LOI by a mixer 724 to generate a base band signal 728. The second RF signal 706 is also mixed with the local oscillating signal LOQ by a mixer 726 to generate a base band signal 730. In the second mode, the mixer 408 is not activated.

Therefore, only one VCO 708 is needed for both receiver portions 700 and 701 to receive different RF signals 704 and 706. In this embodiment, the factors M and N are selected to be 2 and 2 respectively. However, other M and N factor values are possible if the frequencies within the RF receiver are well planned.

Figure 6A:
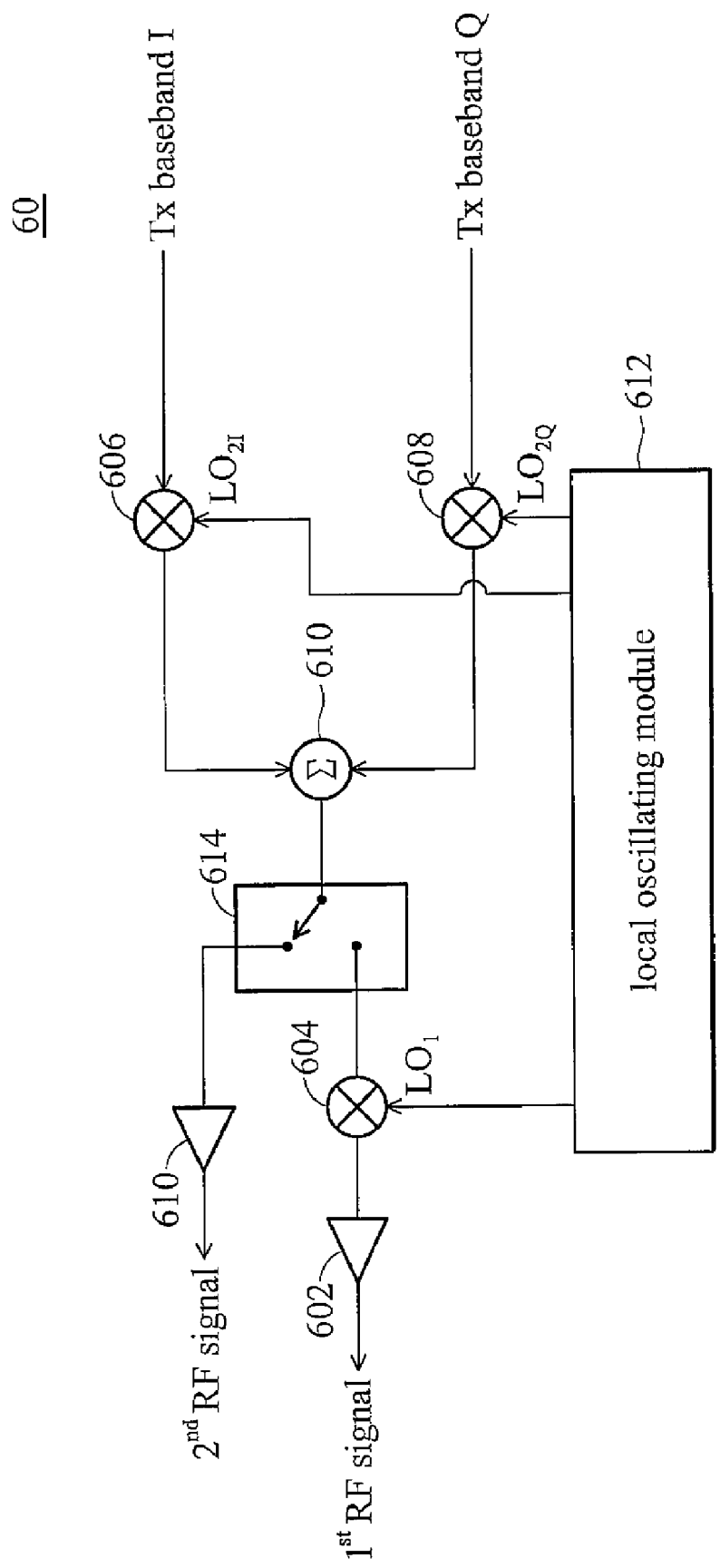
FIG. 6 shows a radio-frequency transmitter according to an embodiment of the invention.

FIG. 6 shows a radio-frequency transmitter according to an embodiment of the invention. The radio-frequency transmitter 60 comprises a first, second, and third mixer 606, 608, and 604, a local oscillating module 612, a first and second amplifier 610 and 602, and a combiner 616. The first and second mixer 606 and 608 respectively receives first and second baseband signal. The local oscillating module 612 generates a first, second and third local oscillating signals $LO_1$, $LO_{2I}/LO_I$, and $LO_{2Q}/LO_Q$, wherein the first local oscillating signal $LO_1$ is generated according to the second local oscillating signal $LO_{2I}/LO_I$, and the first and second local oscillating signals $LO_{2I}/LO_I$ have a phase difference of about 90 degrees. The first and second mixers 606 and 608 respectively mixes the first and second baseband signal with the first and second local oscillating signal $LO_{2I}/LO_I$ and $LO_{2Q}/LO_Q$ to generate first and second intermediate frequency signals. The combiner 616 combines the first and second intermediate frequency signal into third intermediate frequency signal. The third mixers 604 coupled to the combiner 616 mixes the third intermediate frequency signal with the third oscillating signal to generate a first RF signal.

Figure 6B:
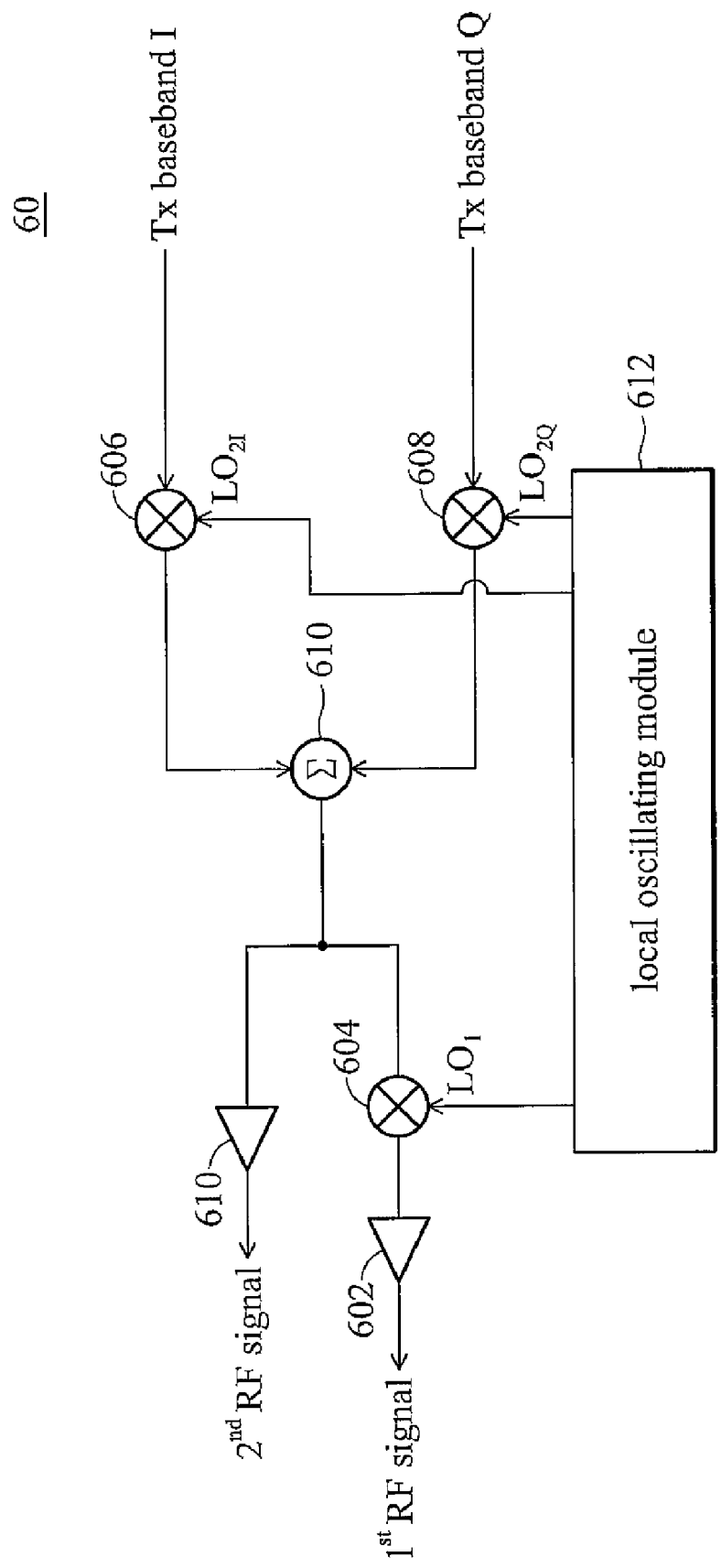

In some embodiments of the invention, the block diagram of the local oscillating module 612 is substantially the same as shown in FIGS. 3, and 4. In other embodiments of the invention, the block diagram of the local oscillating module 612 is substantially the same as shown in FIG. 5, except when operating in the first mode, the local oscillating module 612 generates the $LO_{2I}$, $LO_{2Q}$ and $LO_1$ as the first, second, and third local oscillating signal, and when operating in the second mode, the local oscillating module 612 generates the $LO_I$, $LO_Q$ and $LO_1$ as the first, second, and third local oscillating signal. The switch 614 is optional. In another embodiment of the invention, three nodes of switch 614 can be connected together, as shown in FIG. 6B.

Similarly with the receiver, in a preferred embodiment of the invention, the first RF signal may an 802.11a RF signal, and the second RF may be an 802.11b/g RF signal, which means the RF receiver provided by the invention can meet 802.11a/b/g specifications with only one oscillator. Moreover, by carefully choosing the original oscillating frequency, the RF receiver does not require an image rejection filter. Furthermore, the oscillator does not have to work in a wide range. The original oscillating frequency is between about 3700 MHz to 4700 MHz, which is about 20% tuning range when M and N are both set to 2.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radio-frequency transmitter for operating in a first mode and a second mode, the radio-frequency transmitter comprising:

a first and second power amplifiers amplifying a first and second RF signals;

a local oscillating module generating a first, second and third local oscillating signals, wherein the third local oscillating signal is generated according to the first and the second local oscillating signals, and the first and second local oscillating signals have a phase difference of about 90 degrees;

a first and second mixers mixing a first and second baseband signals with the first and second local oscillating signal, respectively, to generate first and second intermediate frequency signals;

a third mixer for mixing a third intermediate frequency signal with the third local oscillating signal in the first mode to generate the first RF signal, wherein the third intermediate frequency signal is the result of combing the first and second intermediate frequency signals, and the third intermediate frequency signal serves as the second RF signal in the second mode.

2. The radio-frequency transmitter as claimed in claim 1, wherein the local oscillating module further comprises:
- a controllable oscillator generating an original oscillating signal;
- a first frequency divider dividing the original oscillating signal by a factor of N to generate a first and second frequency-divided oscillating signal;
- a second frequency divider dividing the original oscillating signal by a factor M to generate the first and second local oscillating signals; and
- a fourth mixer mixing the first and second frequency-divided oscillating signals with the first and second local oscillating signals to generating the third local oscillating signal.

3. The radio-frequency transmitter as claimed in claim 2, wherein the factor M is 2.

4. The radio-frequency transmitter as claimed in claim 2, wherein the factor N is 2.

5. The radio-frequency transmitter as claimed in claim 1, wherein the local oscillating module further comprises:
- a controllable oscillator generating an original oscillating signal;
- a first frequency divider dividing the original oscillating signal by a factor of N to generate the first and second local oscillating signals;
- a second frequency divider dividing the second oscillating frequency signal by a factor of M to generate a first and a second frequency-divided signal; and
- a mixer mixing the first and second local oscillating signals with the first and second frequency-divided signals to generate the third local oscillating signal.

6. The radio-frequency transmitter as claimed in claim 1, wherein the local oscillating module further comprises:
- a controllable oscillator generating an original oscillating signal;
- a first frequency divider dividing the original oscillating signal by L to generate a first and second oscillating signals to serve as the first and second local oscillating signals in the first mode;
- a second frequency divider coupled to the first frequency divider, dividing the first oscillating signal by M to generate a first frequency-divided oscillating signal;
- a third frequency divider coupled to the second frequency divider, dividing the first frequency-divided oscillating signal by N to generate a second frequency-divided oscillating signal;
- a fourth mixer coupled to the first and second frequency dividers, mixing the first oscillating signal and the first frequency-divided oscillating signal to generate the third local oscillating signal;
- a fifth mixer coupled to the first and third frequency dividers, mixing the first and second oscillating signals with the second frequency-divided oscillating signal to generate the first and second local oscillating signal in the second mode.

7. The radio-frequency transmitter as claimed in claim 6, wherein L, M, and N is 2, 2, and 2.

8. The radio-frequency transmitter as claimed in claim 1, wherein the frequency of the original oscillating signal is less than the first RF signal but exceeds the second RF signal.

9. The radio-frequency transmitter as claimed in claim 1, wherein the first, second, and third mixers are single-side band mixers.

10. The radio-frequency transmitter as claimed in claim 1, wherein the first RF is an 802.11a RF signal, and the second RF is an 802.11b/g RF signal.

11. The radio-frequency transmitter as claimed in claim 1, wherein the frequency of the original oscillating frequency is between about 3840 MHz to 4660 MHz.

12. A radio-frequency (RF) receiver comprising:
- a first low noise amplifier (LNA) amplifying a first RF signal;
- a local oscillating module generating first, second and third local oscillating signals in a first mode, and generating fourth and fifth local oscillating signals in a second mode, wherein the first local oscillating signal is generated according to the second local oscillating signal and the third local oscillating signal, and the second and third local oscillating signals have a phase difference of about 90 degree;
- a first mixer mixing the first RE signal with the first local oscillating signal to generate an intermediate frequency signal in the first mode;
- a second LNA amplifying a second RE signal; and
- a second mixer and a third mixer coupled to the first mixer and operated in two modes, the second and third mixer respectively mix the intermediate frequency signal with the second and third local oscillating signals to generate a first and second baseband signals in the first mode, and the second and third mixer respectively mix the second RF signal with the fourth and fifth local oscillating signals in the second mode.

13. The RF receiver as claimed in claim 12, wherein the local oscillating module comprises:
- a controllable oscillator generating an original oscillating signal;
- a first frequency divider dividing the original oscillating signal by a factor of N to generate a first and a second frequency-divided oscillating signal;
- a second frequency divider dividing the original oscillating signal by a factor M to generate the second, third, fourth and fifth local oscillating signals; and
- a fourth mixer mixing the first and second frequency-divided oscillating signals with the second and third local oscillating signals to generating the first local oscillating signal.

14. The RF receiver as claimed in claim 13, wherein the factor M is 2.

15. The RF receiver as claimed in claim 13, wherein the factor N is 2.

16. The RF receiver as claimed in claim 12, wherein the local oscillating module comprises:
- a controllable oscillator generating an original oscillating signal;
- a first frequency divider dividing the original oscillating signal by a factor of N to generate the second, third, fourth and fifth local oscillating signals;
- a second frequency divider dividing the second oscillating frequency signal by a factor of M to generate a first and a second frequency-divided signal; and
- a fourth mixer mixing the second and the third local oscillating signals with the first and second frequency-divided signals to generate the first local oscillating signal.

17. The RF receiver as claimed in claim 12, wherein the local oscillating module comprises:
- a controllable oscillator generating an original oscillating signal;
- a first frequency divider dividing the original oscillating signal by L to generate the second and third local oscillating signals in the first mode;
- a second frequency divider coupled to the first divider, dividing the second local oscillating signal by M to generate a first frequency-divided oscillating signal;

a third frequency divider coupled to the second frequency divider, dividing the first frequency-divided oscillating signal by N to generate a second frequency-divided oscillating signal;

a fourth mixer coupled to the first and second frequency dividers, mixing the second local oscillating signal and first frequency-divided oscillating signal to generate the first local oscillating signal in the first mode;

a fifth mixer coupled to the first and third frequency divider, mixing the second local oscillating signal and the second frequency divided oscillating signal to generate the fourth and fifth local oscillating signals in the second mode.

18. The RF receiver as claimed in claim 17, wherein L, M, and N is 2, 2, and 2.

19. The RF receiver as claimed in claim 12, wherein the frequency of the original oscillating signal is less than the first RF signal but excesses the second RF signal.

20. RF receiver as claimed in claim 12, wherein the first, second, and third mixers are single-side band mixers.

21. The RF receiver as claimed in claim 12, wherein the second local oscillating signal is an in-phase oscillating signal, and the third local oscillating signal is a quadrature oscillating signal.

22. The RF receiver as claimed in claim 12, wherein the second local oscillating signal is a quadrature oscillating signal, and the third local oscillating signal is a in-phase oscillating signal.

23. The RF receiver as claimed in claim 12, wherein the first RF is an 802.11a RF signal, and the second RF is a 802.11b/g RF signal.

24. The RF receiver as claimed in claim 12, wherein the frequency of the original oscillating frequency is between about 3840 MHz to 4660 MHz.

25. A radio-frequency (RF) receiver comprising:
a first low noise amplifier (LNA);
a local oscillating module;
a first mixer coupled to the first LNA and the local oscillating module;
a second LNA;
a second mixer coupled to the first mixer and the local oscillating module in a first mode, and coupled to the second LNA and the local oscillating module in a second mode; and
a third mixer coupled to the first mixer and the local oscillating module in the first mode, and coupled to the second LNA and the local oscillating module in the second mode.

26. The RF receiver as claimed in claim 25, wherein the local oscillating module comprises:
a controllable oscillator;
a first frequency divider coupled to the controllable oscillator;
a second frequency divider coupled to the controllable oscillator and the second and third mixers; and
a fourth mixer coupled to the first mixer, the first and second frequency dividers.

27. The RF receiver as claimed in claim 25, wherein the local oscillating module comprises:
a controllable oscillator;
a first frequency divider coupled to the controllable oscillator and the second and third mixers;
a second frequency divider coupled to the first frequency divider; and a fourth mixer coupled to the first mixer and the first and second frequency dividers.

28. The RF receiver as claimed in claim 25, wherein the local oscillating module comprises:
a controllable oscillator;
a first frequency divider coupled to the controllable oscillator and the second and third mixers;
a second frequency divider coupled to the first divider;
a third frequency divider coupled to the second frequency divider;
a fourth mixer coupled to the first mixer and the first and second frequency dividers; and
a fifth mixer coupled to the second and third mixers and the first and third frequency dividers.

29. A radio-frequency (RF) receiver comprising:
a local oscillating module generating first, second and third local oscillating signals in a first mode, and generating fourth and fifth local oscillating signals in a second mode, wherein the first local oscillating signal is generated according to the second local oscillating signal and the third local oscillating signal, and the second and third local oscillating signals have a phase difference of about 90 degree;
a first mixer mixing a first RE signal with the first local oscillating signal to generate an intermediate frequency signal in the first mode;
a second mixer and a third mixer coupled to the first mixer respectively mix the intermediate frequency signal with the first and second local oscillating signals to generate a first and second baseband signals in the first mode; and
a fourth mixer and a fifth mixer respectively mix a second RF signal with the fourth and fifth local oscillating signals in the second mode.

30. The RF receiver as claimed in claim 29, wherein the local oscillating module comprises:
a controllable oscillator generating an original oscillating signal;
a first frequency divider dividing the original oscillating signal by a factor of N to generate a first and a second frequency-divided oscillating signal;
a second frequency divider dividing the original oscillating signal by a factor M to generate the second, third, fourth and fifth oscillating signals; and
a sixth mixer mixing the first and second frequency-divided oscillating signals with the second and third oscillating signals to generating the first oscillating signal.

31. The RF receiver as claimed in claim 30, wherein the factor M is 2.

32. The RF receiver as claimed in claim 30, wherein the factor N is 4.

33. The RF receiver as claimed in claim 29, wherein the local oscillating module comprises:
a controllable oscillator generating an original oscillating signal;
a first frequency divider dividing the original oscillating signal by a factor of N to generate the second, third, fourth and fifth oscillating signals;
a second frequency divider dividing the second oscillating frequency signal by a factor of M to generate a first and a second frequency-divided signal; and
a sixth mixer mixing the second and third oscillating signals with the first and second frequency-divided signals to generate the first oscillating signal.

34. The RF receiver as claimed in claim 29, wherein the local oscillating module comprises:
a controllable oscillator generating an original oscillating signal;
a first frequency divider dividing the original oscillating signal by L to generate the second and third local oscillating signals when operated in a first mode;

a second frequency divider coupled to the first divider, dividing the second local oscillating signal by M to generate a first frequency-divided oscillating signal;

a third frequency divider coupled to the second frequency divider, dividing the first frequency-divided oscillating signal by N to generate a second frequency-divided oscillating signal;

a sixth mixer coupled to the first and second frequency dividers, mixing the second local oscillating signal and first frequency-divided oscillating signal to generate the first local oscillating signal in the first mode; and a seventh mixer coupled to the first and third frequency dividers, mixing the second local oscillating signal and the second frequency divided oscillating signal to generate the fourth and fifth local oscillating signal when operated in a second mode.

35. The RF receiver as claimed in claim 34, wherein L, M, and N is 2, 2, and 2.

36. The RF receiver as claimed in claim 29, wherein the frequency of the original oscillating signal is less than the first RE signal but excesses the frequency of the second RF signal.

37. The RF receiver as claimed in claim 29, wherein the first, second, third, fourth, and fifth mixers are single-side band mixers.

38. The RF receiver as claimed in claim 29, wherein the second local oscillating signal is an in-phase oscillating signal, and the third local oscillating signal is a quadrature oscillating signal.

39. The RF receiver as claimed in claim 29, wherein the second local oscillating signal is a quadrature oscillating signal, and the third local oscillating signal is a in-phase oscillating signal.

40. The RF receiver as claimed in claim 29, wherein the first RF is an 802.11 a RF signal, and the second RF is a 802.11b/g RF signal.

41. The RF receiver as claimed in claim 29, wherein the frequency of the original oscillating frequency is between about 3840 MHz to 4660 MHz.

42. The RF receiver as claimed in claim 29 further comprising:

a first low noise amplifier (LNA) amplifying the first RE signal; and a second LNA amplifying the second RF signal.

43. A radio-frequency (RF) receiver comprising:
a local oscillating module;
a first mixer coupled to the local oscillating module;
a second mixer and a third mixer coupled to the first mixer and the local oscillating module; and
a fourth mixer and a fifth mixer coupled to the local oscillating module.

44. The RF receiver as claimed in claim 43, wherein the local oscillating module comprises:
a controllable oscillator;
a first frequency divider coupled to the controllable oscillator;
a second frequency divider coupled to the second, third, fourth and fifth mixers and the controllable oscillator; and
a sixth mixer coupled to the first mixer the first and second frequency dividers.

45. The RF receiver as claimed in claim 43, wherein the local oscillating module comprises:
a controllable oscillator;
a first frequency divider coupled to the second, third, fourth and fifth mixers and the controllable oscillator;
a second frequency divider coupled to the first frequency divider; and
a sixth mixer coupled to the first mixer and the first and second frequency dividers.

46. The RF receiver as claimed in claim 43, wherein the local oscillating module comprises:
a controllable oscillator;
a first frequency divider coupled to the controllable oscillator and the second and third mixers;
a second frequency divider coupled to the first divider;
a third frequency divider coupled to the second frequency divider;
a sixth mixer coupled to the first mixer and the first and second frequency dividers; and
a seventh mixer coupled to the fourth and fifth mixers and the first and third frequency dividers.

* * * * *